(12) United States Patent
Ko et al.

(10) Patent No.: US 8,545,735 B2
(45) Date of Patent: Oct. 1, 2013

(54) MATERIAL OF PHOSPHORUS-DOPED LITHIUM TITANIUM OXIDE WITH SPINEL STRUCTURE AND METHOD OF MANUFACTURING THE SAME

(75) Inventors: Kuan Yu Ko, New Taipei (TW); Shih Chieh Liao, Zhongli (TW); Chia Jung Cheng, Zhubei (TW); Jin Ming Chen, Taoyuan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 265 days.

(21) Appl. No.: 13/041,631

(22) Filed: Mar. 7, 2011

(65) Prior Publication Data

US 2012/0153225 A1    Jun. 21, 2012

(30) Foreign Application Priority Data

Dec. 20, 2010 (TW) ............................... 99144681 A

(51) Int. Cl.
    *H01B 1/08*    (2006.01)
(52) U.S. Cl.
    USPC .................................. 252/520.22; 429/218.1
(58) Field of Classification Search
    USPC ............ 252/518.1, 520.21, 520.22; 429/209, 429/231.95
    See application file for complete search history.

(56) References Cited

U.S. PATENT DOCUMENTS

| 8,173,049 B2* | 5/2012 | Ravet et al. .................... 252/506 |
| 2001/0031401 A1 | 10/2001 | Yamawaki et al. |
| 2008/0166637 A1* | 7/2008 | Inagaki et al. ................ 429/329 |
| 2008/0285211 A1 | 11/2008 | Zaghib et al. |
| 2009/0004563 A1 | 1/2009 | Zhong |
| 2012/0244439 A1* | 9/2012 | Yu et al. ........................ 429/217 |

FOREIGN PATENT DOCUMENTS

| CN | 101373829 A | 2/2009 |
| CN | 101728517 A | 6/2010 |
| JP | 2000277116 A | 10/2000 |
| JP | 2001-155763 | * 6/2001 |

OTHER PUBLICATIONS

WO 2010040285 (pub Apr. 15, 2010) & equiv CN 101373829A (pub Feb. 25, 2009) (including English Abstract).*
Office Action issued on Mar. 12, 2013 for Japanese counterpart application.
English Translation of Office Action issued on Mar. 12, 2013 for Japanese counterpart application.
Office Action issued on May 29, 2013 for Taiwanese counterpart application.

* cited by examiner

*Primary Examiner* — Mark Kopec
(74) *Attorney, Agent, or Firm* — Egbert Law Offices, PLLC

(57) ABSTRACT

A material of phosphorus-doped lithium titanium oxide with spinel structure includes a plurality of lithium titanium oxide particles, wherein a portion or the entirety of the surface layer of the lithium titanium oxide particle is doped with phosphorus. The surface layer is from 1 to 10 nanometers in thickness. Alternatively, the entire lithium titanium oxide particle can be doped with phosphorus. The material can be in powdered form, including a plurality of micro-scale particles each constituted by a plurality of the lithium titanium oxide particles.

4 Claims, 9 Drawing Sheets

MATERIAL OF PHOSPHORUS-DOPED LITHIUM TITANIUM OXIDE WITH SPINEL STRUCTURE AND METHOD OF MANUFACTURING THE SAME

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a lithium titanium oxide material and a method of manufacturing the same.

2. Description of Related Art Including Information Disclosed Under 37 CFR 1.97 and 37 CFR 1.98

A lithium-ion battery is one type of rechargeable battery in which lithium ions move from a negative electrode to a positive electrode during discharge, and move back to the negative electrode when the battery is charged.

The lithium-ion battery has aqueous electrolyte, which includes a solvent and a lithium salt dissolved in the solvent. The lithium salt includes lithium hexafluorophosphate ($LiPF_6$), lithium perchlorate ($LiClO_4$), and lithium tetrafluoroborate ($LiBF_4$). The solvent may include ethylene carbonate, dimethyl carbonate, and diethyl carbonate.

Traditionally, the anode of the lithium-ion battery is made of carbon. When the lithium-ion battery is charged, especially at a charging voltage between 0.4 and 0.9 volts, a solid electrolyte interface (SEI) is easily formed on the carbon anode. The formation of SEI, which is irreversible, causes the battery to have high irreversible capacitance, approximately in a range of from 30 to 55 mAh/g, to easily self-discharge, and to generate excess heat, causing a safety issue.

The anode manufactured using lithium titanium oxide has good structural stability and long cycle life, will not easily react with electrolyte, and is not subject to the occurrence of lithium deposition. The three-dimensional structure of lithium titanium oxide spinel allows lithium ions to intercalate and de-intercalate easily. Due to the above advantages, lithium titanium oxide is suitable for manufacturing anodes for high charge and discharge current applications.

However, according to research, lithium titanium oxide has poor electrical conductivity (around 10-13 S/cm), and the charge and discharge rates are limited by the particle sizes of the material. Thus, an improvement is needed for increasing the electrical conductivity.

BRIEF SUMMARY OF THE INVENTION

In view of the above issues, one embodiment of the present invention proposes a phosphorus-doped lithium titanium oxide material.

One embodiment of the present invention proposes a method of manufacturing a material of phosphorus-doped lithium titanium oxide with spinel structure. The method comprises mixing a plurality of oxide particles, a phosphorous compound, and deionized water to obtain a mixed solution or slurry, wherein the oxide particles are lithium titanium oxide particles, or comprise mixed particles of $Li_4Ti_5O_{12}$, titanium dioxide, and $Li_2TiO_3$, drying the mixed solution at a temperature in a range of from 60 to 90 degrees Celsius to obtain a dried product, and sintering the dried product in a first sintering atmosphere at a temperature in a range of from 700 to 950 degrees Celsius for a time of from 1 to 10 hours.

Another embodiment of the present invention proposes a method of manufacturing a lithium titanium oxide material. The method comprises mixing a lithium source, a titanium source, a phosphorous compound, and deionized water to obtain a slurry, spraying the slurry at a temperature of from 100 to 300 degrees Celsius to obtain a plurality of precursor particles, sintering the plurality of precursor particles in a sintering atmosphere at a first temperature in a range of from 400 to 700 degrees Celsius for a first time of from 0.5 to 2 hours to obtain a mixture, and sintering the mixture in the sintering atmosphere at a second temperature in a range of from 700 to 950 degrees Celsius for a second time of from 1 to 10 hours to obtain a mixture.

In one embodiment, the above methods further comprise a step of adding one or more doped metal sources to the slurry.

The use of the anode manufactured using the lithium titanium oxide material obtained by sintering lithium titanium oxide and a phosphorous compound can result in better electrical conductivity, faster charge and discharge rates, and longer life cycles.

To better understand the above-described objectives, characteristics and advantages of the present invention, embodiments, with reference to the drawings, are provided for detailed explanations.

BRIEF DESCRIPTION OF THE SEVERAL VIEWS OF THE DRAWINGS

The invention will be described according to the appended drawings in which.

DETAILED DESCRIPTION OF THE INVENTION

Figure 1:
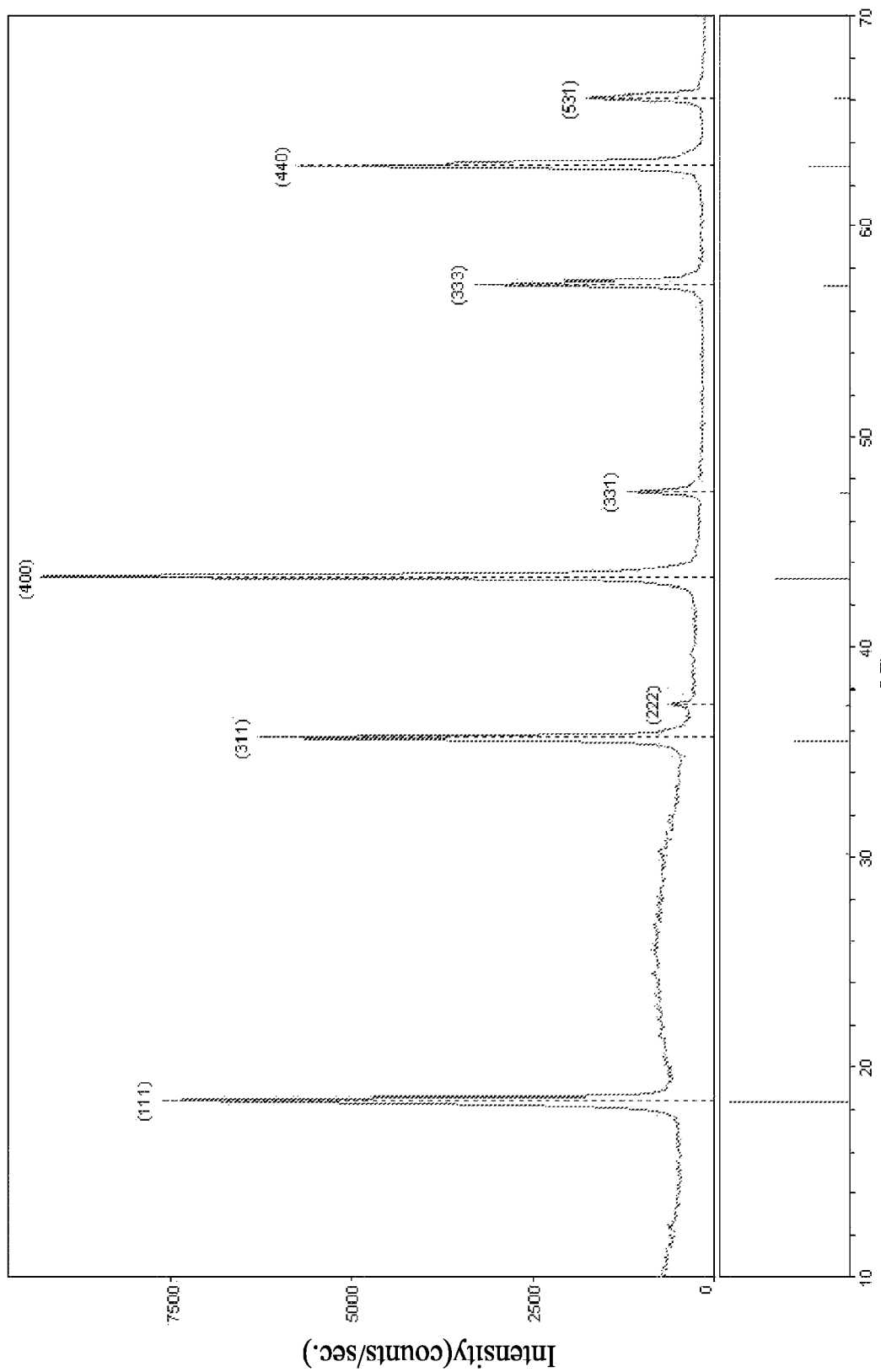
FIG. 1 is an X-ray diffraction pattern for the oxygen-deficient lithium titanium oxide particles with doped surface layers according to the first example of the present invention.

Lithium titanium oxide and a phosphorous compound are mixed and sintered to form a lithium titanium oxide material containing a composition of lithium titanium oxide and phosphorus. The composition of lithium titanium oxide and phosphorus may be in crystal or non-crystal form, and can improve the electrical conductivity of lithium titanium oxide material. The lithium titanium oxide material can partly contain the composition, or the lithium titanium oxide material can be completely constituted by the composition. The lithium titanium oxide material may include a plurality of particles, and phosphorus can be distributed in surface layers of the particles. Such type of doping is called surface layer doping. In one embodiment, the composition can be formed in a portion of the surface layer of the particle, or in the entire surface layer of the particle. The surface layer can have a thickness of from 1 to 10 nanometers. In another embodiment, the particle can be completely constituted by the composition; such type of doping is called complete doping.

The above-mentioned particles can be nanoparticles with sizes in a range of from 10 to 300 nanometers. A plurality of nanoparticles can constitute a porous microparticle. The lithium titanium oxide material may include a plurality of porous microparticles. In one embodiment, the microparticle can have a size in a range of from 0.3 to 60 micrometers. The lithium titanium oxide material has a porous structure so as to have a larger reaction surface. In addition, the electrodes using the lithium titanium oxide material composed of nanoparticles provide shorter diffusion paths for lithium ions.

The lithium titanium oxide can be in particulate form and can have a spinel structure. The lithium titanium oxide particles can be formed by sintering, in an atmosphere, such as air, a noble gas or a reduced gas at a temperature of from 400 to 700 degrees Celsius for 0.5 to 2 hours, the precursor particles produced by spray drying a slurry obtained by mixing a lithium source and a titanium source at a temperature of from 100 to 300 degrees Celsius. The noble gas may be argon, nitrogen or helium. The reduced gas can be a mixture of hydrogen and argon or a mixture of hydrogen and nitrogen, wherein the hydrogen can be in an amount of from 1 to 10 percent by volume of the total gas mixture. The lithium source can be lithium nitrate ($LiNO_3$), lithium hydroxide (LiOH), lithium acetate ($CH_3COOLi.2H_2O$), or lithium oxalate ($Li_2C_2O_4$). The titanium source can be titanium dioxide having a particle diameter in a range of from 10 to 300 nanometers. The size of the lithium titanium oxide particles can be controlled, and the control method includes the method of controlling the sintering temperature, controlling sintering time, or adding a volatile material for encapsulating the lithium titanium oxide material to the mixing slurry. The above-mentioned control methods are well known so that the method steps are not detailed here.

The lithium titanium oxide can be non-oxygen-deficient lithium titanium oxide, having the formula $Li_4Ti_5O_{12}$. The lithium titanium oxide can be oxygen-deficient lithium titanium oxide, having the formula $Li_4Ti_5O_{12-z}$, where z is greater than 0. The lithium titanium oxide can be non-doped lithium titanium oxide or metal-doped lithium titanium oxide. The lithium titanium oxide can be doped with one or more metals. In one embodiment, the doping metals can include magnesium and chromium, and the doped or substituted lithium titanium oxide has the formula $Li_{4-x}Mg_xTi_{5-y}Cr_yO_{12}$, where $0<x<0.2$, $0<y<0.2$ and $z<x-y$. The lithium titanium oxide doped with two metals can be acquired by spray drying a slurry obtained by mixing a lithium source, a titanium source, a magnesium source, and a chromium source at a temperature of from 100 to 300 degrees Celsius and sintering the particles in an atmosphere, such as air, a noble gas or a reduced gas at a temperature of from 400 to 700 degrees Celsius for 0.5 to 2 hours.

A phosphorus doping treatment can be applied to the lithium titanium oxide particles, producing a composition of lithium titanium oxide and phosphorus formed in the lithium titanium oxide particles. The lithium titanium oxide particles can be added to a solution including a phosphorous compound. The solution is then dried and sintered, generating lithium titanium oxide particles composed of lithium titanium oxide and phosphorus. The weight ratio of the phosphorous compound to the oxide particles is between 0.01 and 0.2. In addition, lithium titanium oxide particles composed of lithium titanium oxide and phosphorus can be produced by mixing a lithium source, a titanium source, a phosphorous compound and a solvent, or mixing a lithium source, a titanium source, a magnesium source, a chromium source and a phosphorous compound to obtain a slurry or mixed powders; and sintering the mixed powders or drying and sintering the slurry. The phosphorous compound may be ammonium dihydrogen phosphate ($NH_4H_2PO_4$), ammonium metaphosphate ($NH_4PO_3$), diammonium hydrogen phosphate (($NH_4$)$_2HPO_4$), or phosphoric acid ($H_3PO_4$). The solution containing the lithium titanium oxide particles, the phosphorous compound, and the solvent can be dried at a temperature between 60 and 90 degrees Celsius. The dried product can be sintered in a noble gas or reduced gas atmosphere at a temperature of from 700 to 950 degrees Celsius for 1 to 10 hours. The noble gas can be argon, nitrogen or helium. The reduced gas can be a mixture of hydrogen and argon or a mixture of hydrogen and nitrogen, wherein the hydrogen can be in an amount of from 1 to 10 percent by volume of the total gas mixture. The sintered product may comprise a plurality of primary particles, which can constitute porous secondary spherical particles.

Example 1

99.6 grams of lithium nitrate, 140.3 grams of titanium dioxide, 8.2 grams of chromic acetate monohydrate, and 3.8 grams of magnesium acetate are added to 590 grams of deionized water to obtain a mixed solution. The mixed solution is ground in a ball mill for 16 hours to obtain slurry. A spray drying process is applied to rapidly dry the slurry at a temperature of 160 degrees Celsius to obtain a plurality of precursor particles. Next, the plurality of precursor particles are sintered in an atmosphere containing argon/hydrogen (at a 95:5 volume ratio) at a temperature of 650 degrees Celsius for one hour to form a mixture including $TiO_2$, $Li_2TiO_3$, $Li_4Ti_5O_{12}$, chromium, and magnesium, wherein the chromium and magnesium are doped into and solid-soluted in the $TiO_2$, $Li_2TiO_3$, $Li_4Ti_5O_{12}$. Next, the above pre-sintered mixture and ammonium dihydrogen phosphate are added to deionized water, mixed for 16 hours to obtain a mixed material, wherein the ammonium dihydrogen phosphate is in an amount of 3 percent by weight of the pre-sintered mixture. The mixed material is dried at temperature of 80 degrees Celsius, and then milled in a mortar for a second stage sintering. The second stage sintering is performed in an atmosphere containing argon/hydrogen (at a 95:5 volume ratio) at temperature of 750 degrees Celsius for two hours. After the second stage sintering is finished, oxygen-deficient lithium titanium oxide powder material is obtained, particles of which have doped surface layers.

Figure 7:
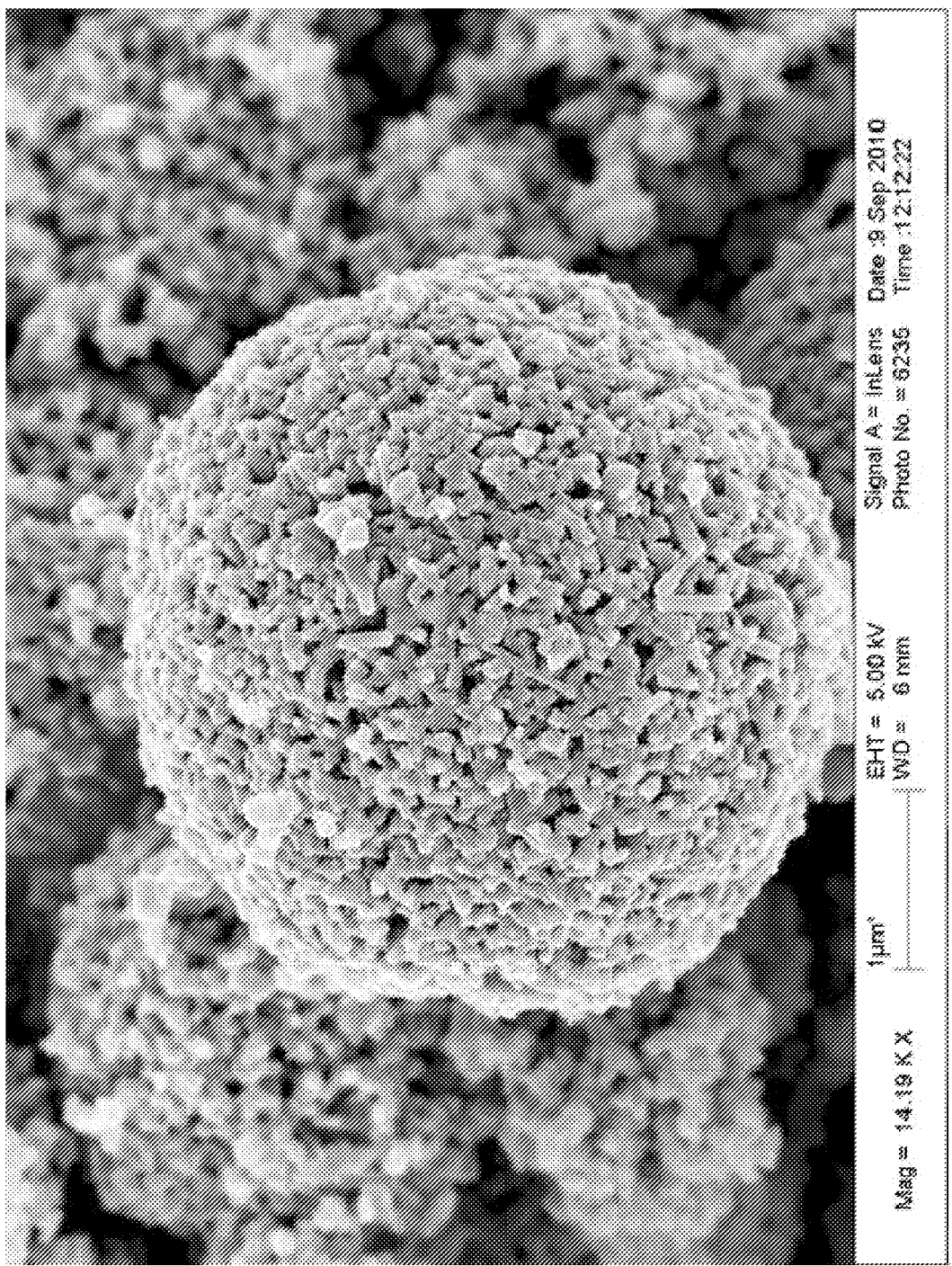
FIG. 7 shows an oxygen-deficient lithium titanium oxide powder, particles of which have doped surface layers, according to one embodiment of the present invention.
Figure 8:
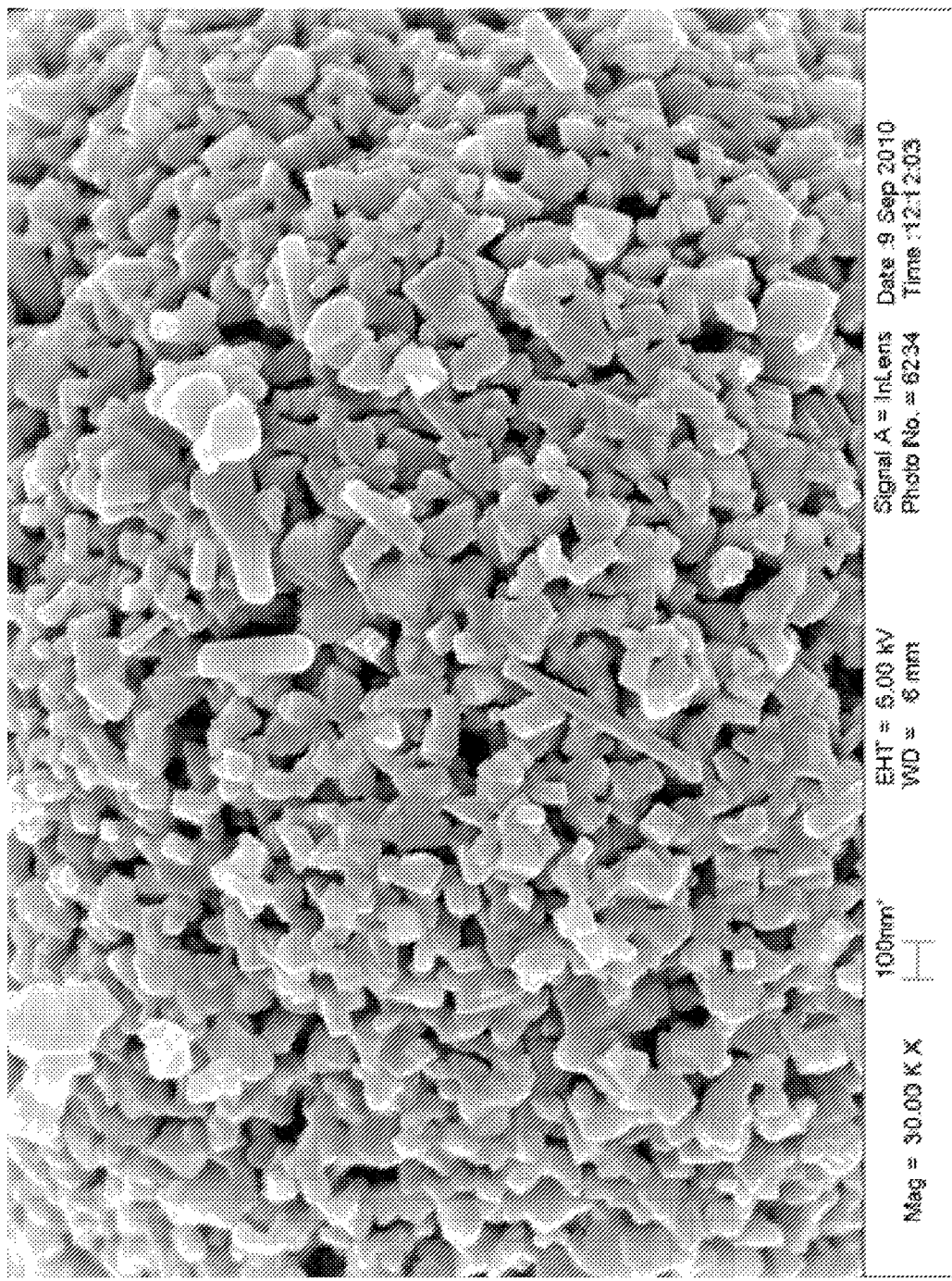
FIG. 8 shows the particles of the oxygen-deficient lithium titanium oxide powder according to one embodiment of the present invention.

The oxygen-deficient lithium titanium oxide powder having particles with doped surface layers can be constituted by a plurality of secondary particles as shown in FIG. 7. The secondary particles can have diameters in a range of from 0.3 to 6 micrometers. Each secondary particle is composed of a plurality of primary particles, wherein the primary particle can have a diameter of about 100 nanometers as shown in FIG. 8.

FIG. 1 is an x-ray diffraction pattern for the oxygen-deficient lithium titanium oxide particles with doped surface layers according to the first example of the present invention. As shown in FIG. 1, the oxygen-deficient lithium titanium oxide has a spinel structure. FIG. 1 demonstrates that the doping with phosphorus will not change the spinel structure of the original lithium titanium oxide particle.

Figure 2:
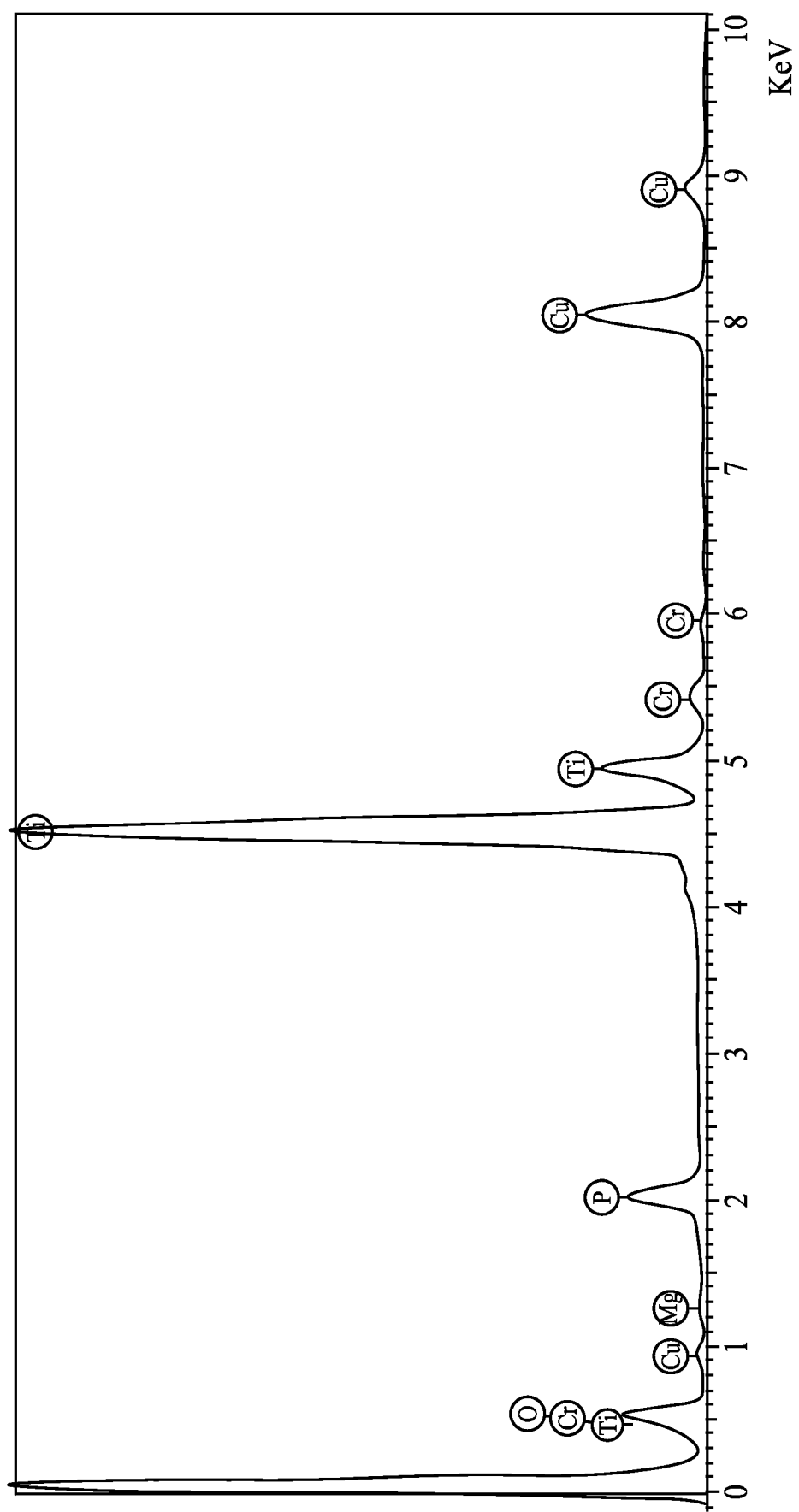
FIG. 2 is a diagram showing the result of analysis of the surface layers of oxygen-deficient lithium titanium oxide particles with surface layers doped by employing energy dispersive X-ray spectrometry according to one embodiment of the present invention.

FIG. 2 is a diagram showing the result of analysis of the surface layers of oxygen-deficient lithium titanium oxide particles with doped surface layers by employing energy dispersive X-ray spectrometry according to one embodiment of the present invention. Referring to FIG. 2, the analysis of the surface layers of the lithium titanium oxide particles shows that the surface layers of the lithium titanium oxide particles include phosphorus. The analysis shown in FIG. 1 reveals that the phosphorous lithium titanium oxide particle still has the spinel structure of $Li_4Ti_5O_{12}$, which suggests that phosphorus is successfully incorporated into the surface layers of the lithium titanium oxide particles, and since no impurity phase is observed, shows that the phosphorus is combined with the lithium titanium oxide to form a composition.

Figure 9:
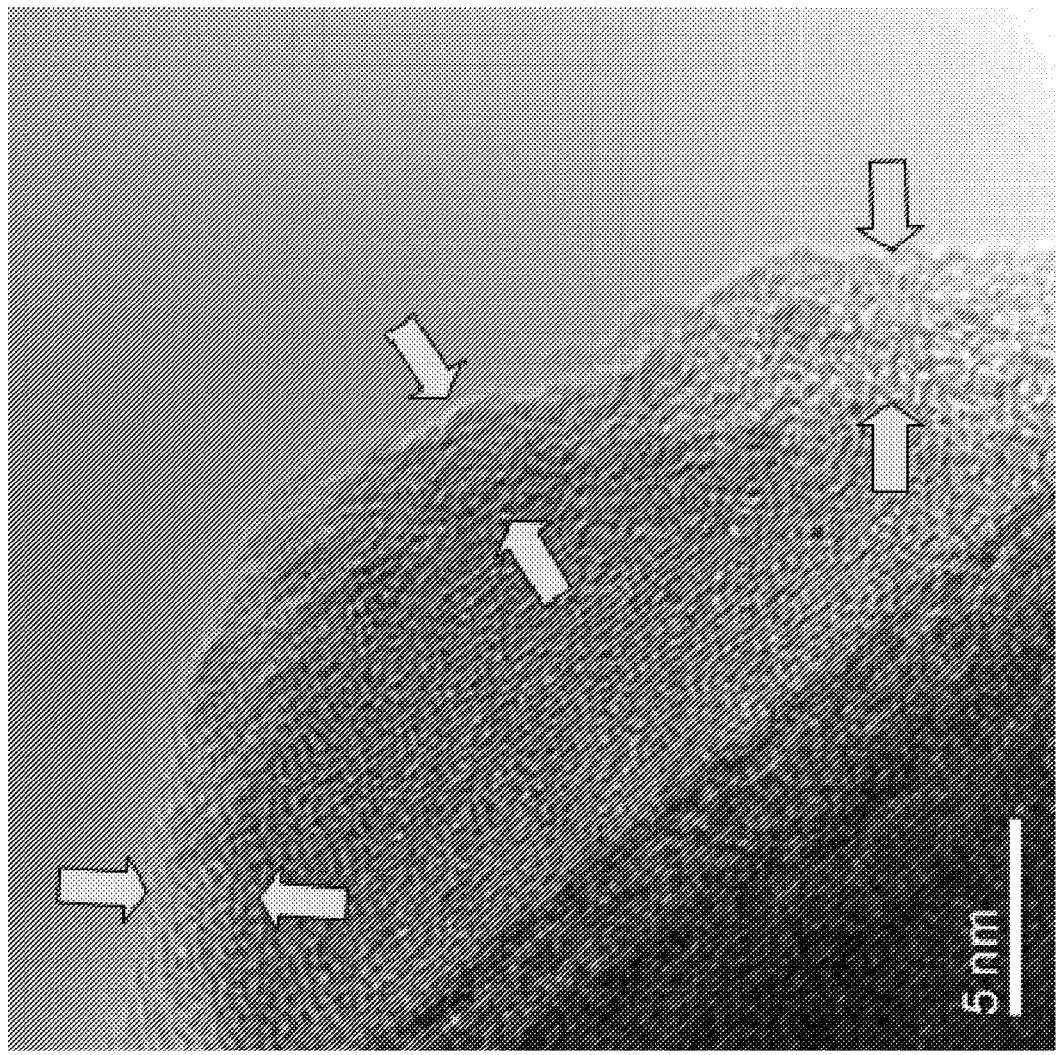
FIG. 9 shows the phosphorus-doped surface layer of an oxygen-deficient lithium titanium oxide particle according to one embodiment of the present invention.

Referring to FIG. 9, through a measuring procedure, it can be found the thickness of the surface layer is in a range of from 1 to 10 nanometers as indicated by the distance between the two arrows pointing toward each other.

Figure 3:
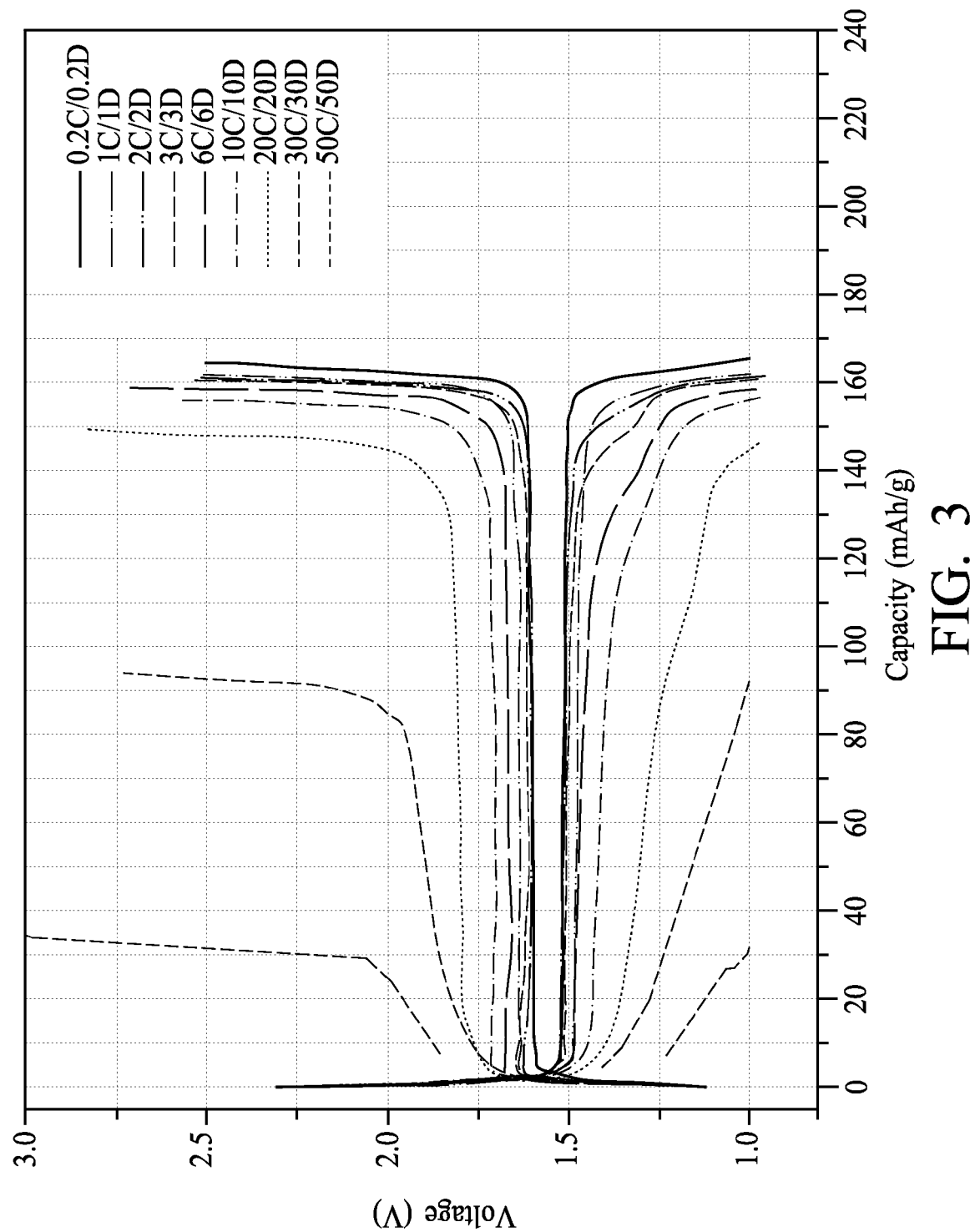
FIG. 3 is a diagram showing the result of a charge/discharge cycle test according one embodiment of the present invention.

Oxygen-deficient lithium titanium oxide particles with doped surface layers, a binder such as polyvinylidene fluoride, and a solvent such as N-methyl-2-pyrrolidone are mixed to form a paste. The paste is coated on an aluminum foil, cut into round electrodes to serve as the anode of a button type battery. The button type battery has a cathode made of lithium. The anode and cathode of the button type battery are separated by a separator, in which electrolyte is filled. A constant-current charge-discharge test is performed on the button type battery, and it can be seen that under the charge/discharge rate of 0.2 C, the battery has a capacity of 165 mAh/g if the battery voltage reaches final discharge/charge voltage levels of 1 and 2.5 volts, as shown in FIG. 3. Under the charge/discharge rate of 10 C, the battery has a capacity of 155 mAh/g if the battery voltage reaches final discharge/charge voltage levels of 1 and 2.5 volts. Under the charge/discharge rate of 20 C, the battery has a capacity of 143 mAh/g if the battery voltage reaches final discharge/charge voltage levels of 1 and 2.5 volts.

Comparative Example 1

99.6 grams of lithium nitrate, 140.3 grams of titanium dioxide, 8.2 grams of chromic acetate monohydrate, and 3.8 grams of magnesium acetate are added to 590 grams of deionized water to obtain a mixed solution. The mixed solution is ground in a ball mill for 16 hours to obtain slurry. A spray drying process is applied to rapidly dry the slurry at a temperature of 160 degrees Celsius to obtain a plurality of precursor particles. Thereafter, the plurality of precursor particles are sintered in an atmosphere containing argon/hydrogen (at a 95:5 volume ratio) at a temperature of 650 degrees Celsius for one hour to form a mixture including $TiO_2$, $Li_2TiO_3$, $Li_4Ti_5O_{12}$, chromium, and magnesium, wherein the chromium and magnesium are doped into and solid-soluted in the $TiO_2$, $Li_2TiO_3$, $Li_4Ti_5O_{12}$.

Figure 5:
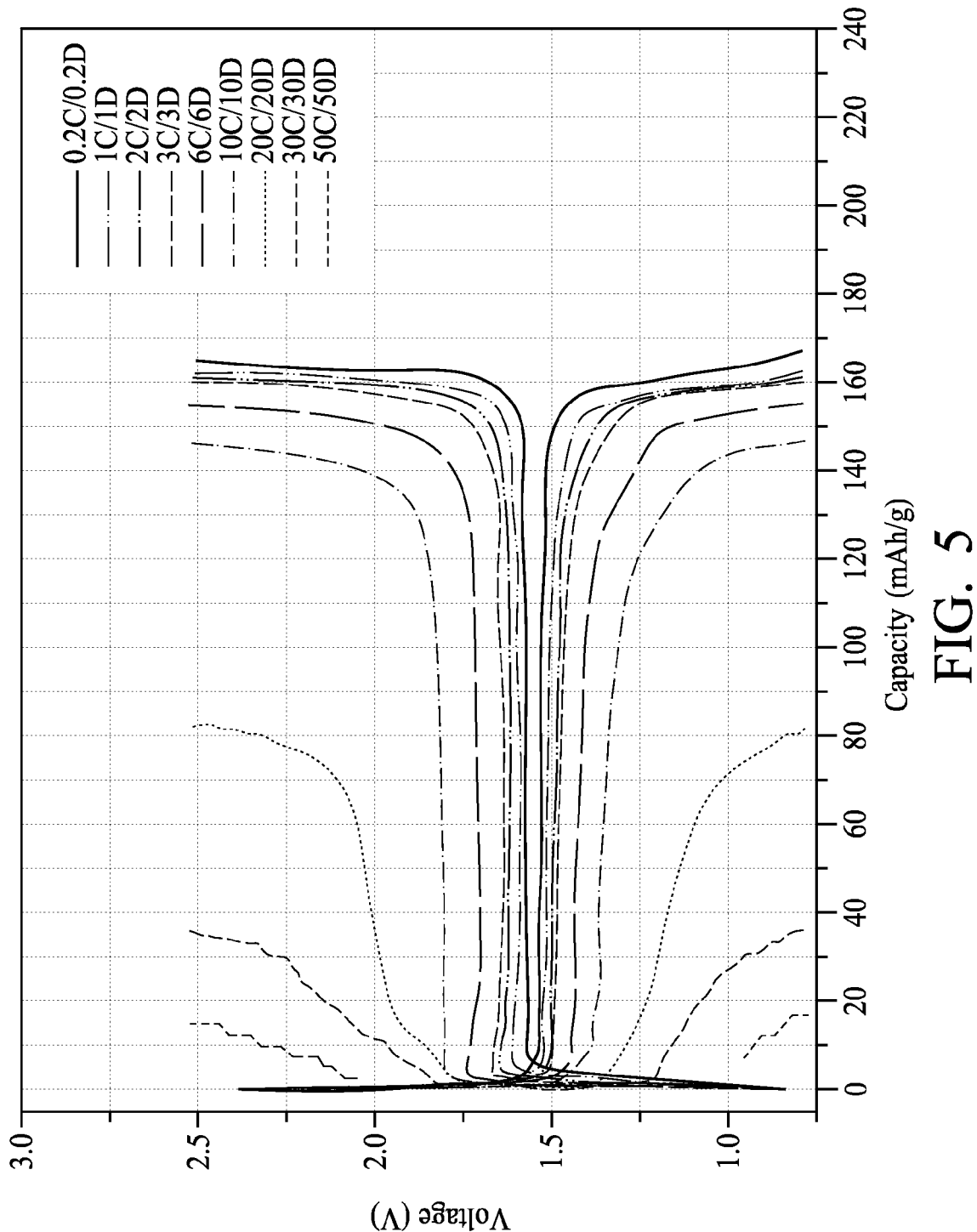
FIG. 5 is a diagram showing the result of a charge/discharge cycle test for a comparative example.

The obtained oxygen-deficient lithium titanium oxide particles, a binder such as polyvinylidene fluoride, and a solvent such as N-methyl-2-pyrrolidone are blended to form a paste. The paste is coated on an aluminum foil, and cut into round electrodes to serve as the anode of a button type battery. The button type battery has a cathode made of lithium. The anode and cathode of the button type battery are separated by a separator, in which electrolyte is filled. A constant-current charge-discharge test is performed on the button type battery, and it can be seen that under the charge/discharge rate of 0.2 C, the battery has a capacity of 164 mAh/g if the battery voltage reaches final discharge/charge voltage levels of 0.8 and 2.5 volts, as shown in FIG. 5. Under the charge/discharge rate of 10 C, the battery has a capacity of 148 mAh/g. Under the charge/discharge rate of 20 C, the battery has a capacity of 80 mAh/g.

Comparing the results of Example 1 and Comparative Example 1, it can be seen that the battery including the anode made of the oxygen-deficient lithium titanium oxide particles with doped surface layers has a larger capacity when the battery is at faster charge/discharge rates.

Figure 4:
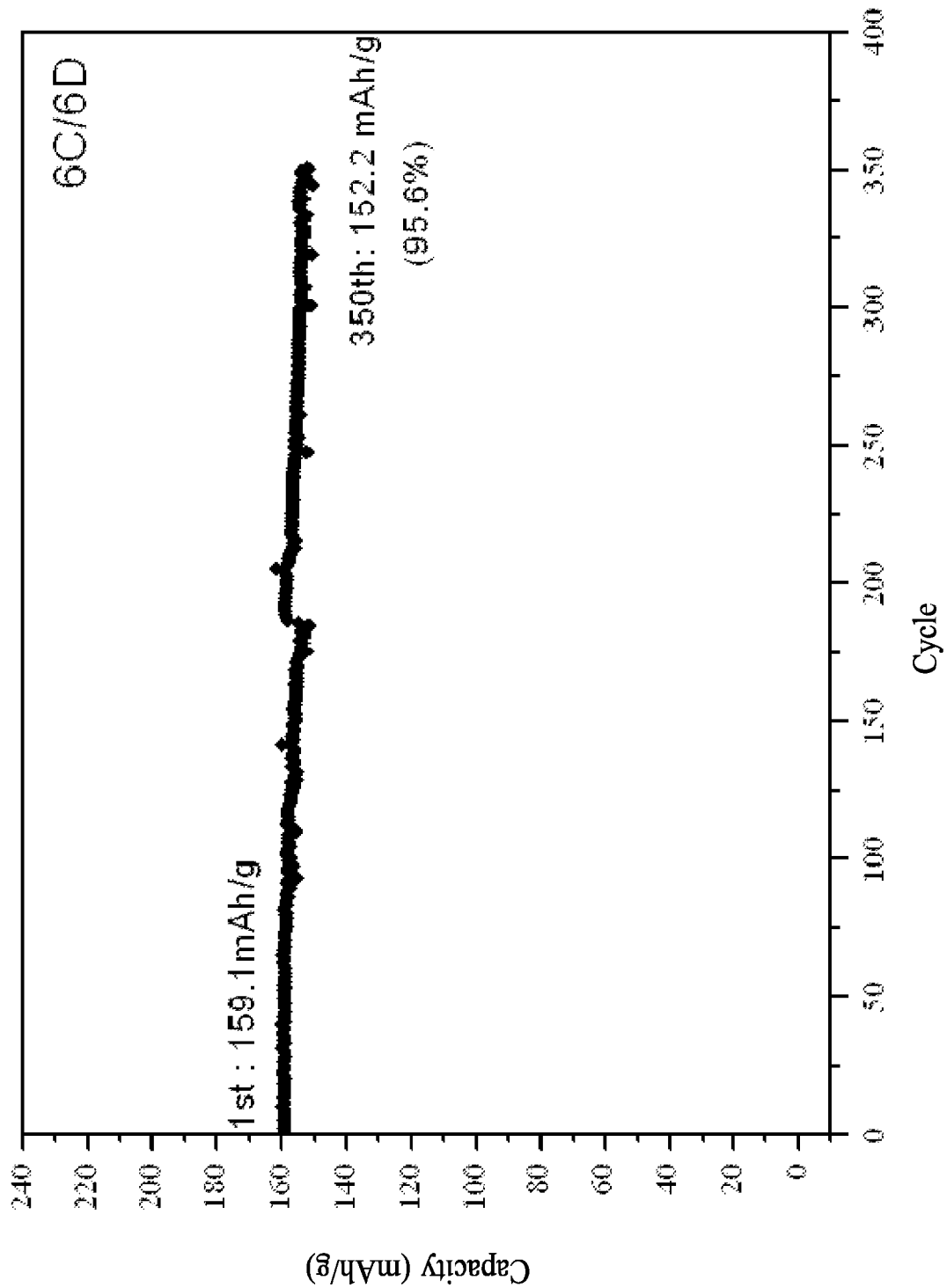
FIG. 4 is a diagram of a curve showing the relationship between capacity and charge/discharge cycles according to one embodiment of the present invention.
Figure 6:
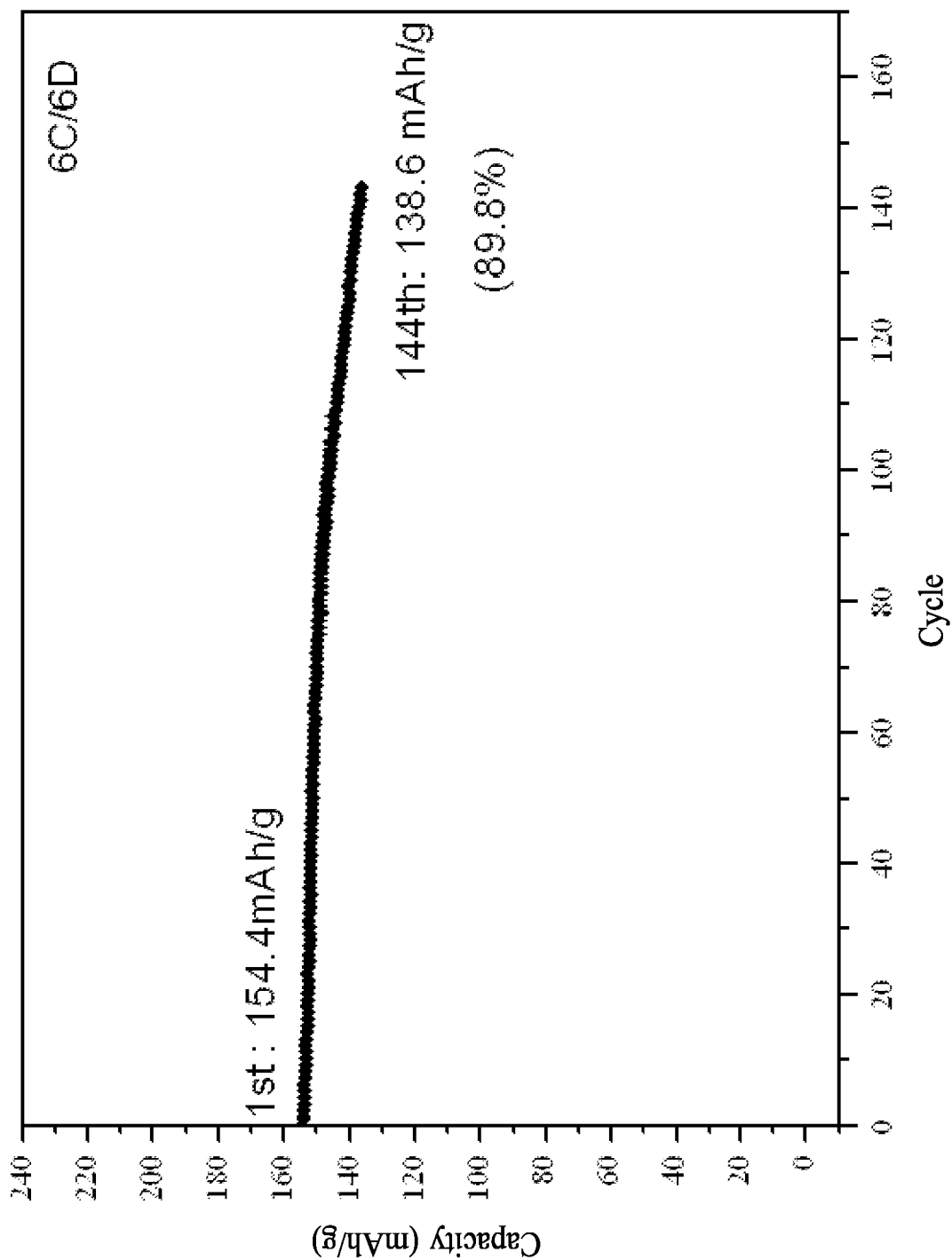
FIG. 6 is a diagram of a curve showing the relationship between capacity and charge/discharge cycles for a comparative example.

Comparing the results in FIGS. 4 and 6, it can be seen that the anode made of the oxygen-deficient lithium titanium oxide particles with doped surface layers of Example 1 can mitigate the deterioration of the battery capacity after the batteries go through several charge/discharge cycles at the charge/discharge rate of 6 C. In FIG. 4, the battery capacity is reduced from 159.1 mAh/g, measured after one charge/discharge cycle is performed, to 152.2 mAh/g, measured after 350 charge/discharge cycles are performed. Comparatively, in FIG. 6, the battery capacity is reduced from 154.4 mAh/g, measured after one charge/discharge cycle is performed, to 138.6 mAh/g, measured after 144 charge/discharge cycles are performed.

Example 2

159.3 grams of lithium nitrate, 224.5 grams of titanium dioxide, 13.1 grams of chromic acetate monohydrate, and 6.2 grams of magnesium acetate are added to 900 grams of deionized water. The mixed solution is ground in a ball mill for 12 hours to obtain slurry. The slurry is rapidly dried at a drying temperature of 160 degrees Celsius to obtain a plurality of precursor particles. The plurality of precursor particles are sintered in air at a temperature of 650 degrees Celsius for one hour to form a mixture including $TiO_2$, $Li_2TiO_3$, $Li_4Ti_5O_{12}$, chromium, and magnesium, wherein the chromium and magnesium are doped into and solid-soluted in the $TiO_2$, $Li_2TiO_3$, $Li_4Ti_5O_{12}$. The pre-sintered mixture and ammonium dihydrogen phosphate are added to deionized water, mixed for 12 hours to obtain a mixed material, wherein the ammonium dihydrogen phosphate is in an amount of 3 percent by weight of the pre-sintered mixture. The mixed material is dried at a temperature of 80 degrees Celsius, and then milled in a mortar for a second stage sintering. The second stage sintering is performed in an atmosphere of air at a temperature of 800 degrees Celsius for two hours. After the second stage sintering is finished, lithium titanium oxide particles having doped surface layers are obtained. Applying the test methods demonstrated in the embodiment of Example 1 produces the results shown in Table 1 below.

TABLE 1

|  | Example 1 | Example 2 | Example 3 | Example 4 | Example 5 | Comparative Example 1 |
|---|---|---|---|---|---|---|
| Charge/discharge rate of 0.2 C | 165 mAh/g | 151 mAh/g | 164 mAh/g | 145 mAh/g | 166 mAh/g | 164 mAh/g |
| Charge/discharge rate of 10 C | 155 mAh/g | 138 mAh/g | 145 mAh/g | 122 mAh/g | 142 mAh/g | 148 mAh/g |
| Charge/discharge rate of 20 C | 142 mAh/g | 122 mAh/g | 132 mAh/g | 102 mAh/g | 112 mAh/g | 80 mA/g |

Example 3

59.7 grams of lithium nitrate, 84.3 grams of titanium dioxide, 4.9 grams of chromic acetate monohydrate, 2.3 grams of magnesium acetate, and 3.03 grams of ammonium dihydrogen phosphate are added to 333 grams of deionized water. The mixed solution is ground in a ball mill for 15 hours to obtain slurry. A spray drying process is applied to rapidly dry the slurry at temperature of 160 degrees Celsius to obtain a plurality of precursor particles. Next, the plurality of precursor particles are sintered in an atmosphere containing argon/hydrogen (at a 95:5 volume ratio) at a temperature of 650 degrees Celsius for one hour to form a mixture including $TiO_2$, $Li_2TiO_3$, $Li_4Ti_5O_{12}$, chromium, and magnesium, wherein the chromium and magnesium are doped into and solid-soluted in the $TiO_2$, $Li_2TiO_3$, $Li_4Ti_5O_{12}$. The mixture in an atmosphere containing argon/hydrogen (at a 95:5 volume ratio) undergoes a second stage sintering, wherein the second stage sintering is performed at a sintering temperature of 750 degrees Celsius for two hours. After the second stage sintering is finished, oxygen-deficient lithium titanium oxide particles, which are doped with phosphorus, are obtained. Applying the test methods demonstrated in the embodiment of Example 1 produces the results shown in Table 1.

Example 4

291.6 grams of lithium nitrate and 414.1 grams of titanium dioxide are added to 1866.7 grams of deionized water. The mixed solution is ground in a ball mill for 16 hours to obtain slurry. A spray drying process is applied to rapidly dry the slurry to obtain a plurality of precursor particles, wherein the process is performed at temperature of 170 degrees Celsius. The precursor particles are sintered in air at a temperature of 650 degrees Celsius for one hour to form a mixture including $TiO_2$, $Li_2TiO_3$, $Li_4Ti_5O_{12}$. The mixture and phosphorus are added to deionized water and mixed for 16 hours, wherein the phosphorus is added in an amount of 5 percent by weight of the pre-sintered mixture. The mixed material is dried at a temperature of 80 degrees Celsius, and then milled in a mortar. A second stage sintering is conducted for the milled material in an air atmosphere, wherein the second stage sintering is performed at temperature of 750 degrees Celsius for two hours. After the second stage sintering is finished, lithium titanium oxide particles having doped surface layers are obtained. Applying the test methods demonstrated in Example 1 produces the results shown in Table 1.

Example 5

120.9 grams of lithium nitrate, 169.3 grams of titanium dioxide, 9.9 grams of chromic acetate monohydrate, and 2.3 grams of magnesium acetate are added to 333 grams of deionized water to obtain a mixed solution. The mixed solution is ground in a ball mill for 16 hours to obtain slurry. A spray drying process is applied to rapidly dry the slurry to obtain a plurality of precursor particles, wherein the drying temperature is 165 degrees Celsius. Thereafter, the plurality of precursor particles are sintered in an air atmosphere at temperature of 650 degrees Celsius for 1 hour to obtain a mixture including $TiO_2$, $Li_2TiO_3$, $Li_4Ti_5O_{12}$, chromium, and magnesium, wherein the chromium and magnesium is doped into and solid-soluted in the $TiO_2$, $Li_2TiO_3$, $Li_4Ti_5O_{12}$. The pre-sintered mixture and phosphorus are added to deionized water and mixed for 16 hours, wherein the phosphorus is added in an amount of 5 percent by weight of the pre-sintered mixture. The mixed material is dried at temperature of 80 degrees Celsius, and then milled in a mortar. A second stage sintering is conducted for the milled material in an air atmosphere, wherein the second stage sintering is performed at temperature of 750 degrees Celsius for 2 hours. After the second stage sintering is finished, lithium titanium oxide particles having doped surface layers are obtained. Applying the test methods demonstrated in Example 1 produces the results shown in Table 1.

The above-described embodiments of the present invention are intended to be illustrative only. Numerous alternative embodiments may be devised by persons skilled in the art without departing from the scope of the following claims.

We claim:

1. A material of phosphorus-doped lithium titanium oxide with a spinel structure, wherein the phosphorus-doped lithium titanium oxide comprises $Li_{4-x}Mg_xTi_{5-y}Cr_yO_{12-z}$, where $0<x<0.2$, $0<y<0.2$, $z<y-x$ and the phosphorus-doped lithium titanium oxide has no impurity phase.

2. The material of claim 1, wherein said phosphorus-doped lithium titanium oxide comprises a plurality of primary particles, wherein phosphorus is in portions of surface layers or entire surface layers of the primary particles, wherein the thickness of the surface layer is in a range of from 1 to 10 nanometers, or the phosphorus is in the entire primary particle.

3. The material of claim 1, wherein said phosphorus-doped lithium titanium oxide comprises a plurality of microparticles each comprising a plurality of the primary particles, wherein the microparticle has a size of from 0.3 to 60 micrometers, and the primary particle has a size of from 10 to 300 nanometers.

4. An anode comprising:
a material of phosphorus-doped lithium titanium oxide with a spinel structure, wherein the phosphorus-doped lithium titanium oxide comprises $Li_{4-x}Mg_xTi_{5-y}Cr_yO_{12-z}$, where $0<x<0.2$, $0<y<0.2$, $z<y-x$ and the phosphorus-doped lithium titanium oxide has no impurity phase.

* * * * *